US010657379B2

United States Patent
Rav-Acha et al.

(10) Patent No.: US 10,657,379 B2
(45) Date of Patent: May 19, 2020

(54) METHOD AND SYSTEM FOR USING SEMANTIC-SEGMENTATION FOR AUTOMATICALLY GENERATING EFFECTS AND TRANSITIONS IN VIDEO PRODUCTIONS

(71) Applicant: Vimeo, Inc., New York, NY (US)

(72) Inventors: Alexander Rav-Acha, Rehovot (IL); Oren Boiman, Sunnyvale, CA (US)

(73) Assignee: Vimeo, Inc., New York, NY (US)

( * ) Notice: Subject to any disclaimer, the term of this patent is extended or adjusted under 35 U.S.C. 154(b) by 0 days.

(21) Appl. No.: 16/446,006

(22) Filed: Jun. 19, 2019

(65) Prior Publication Data

US 2019/0384984 A1 Dec. 19, 2019

Related U.S. Application Data

(60) Provisional application No. 62/686,715, filed on Jun. 19, 2018.

(51) Int. Cl.
*G06K 9/00* (2006.01)
*H04N 21/431* (2011.01)
*G06T 7/194* (2017.01)
*G06T 7/215* (2017.01)
*G11B 27/031* (2006.01)

(52) U.S. Cl.
CPC ..... *G06K 9/00718* (2013.01); *G06K 9/00765* (2013.01); *G06T 7/194* (2017.01); *G06T 7/215* (2017.01); *G11B 27/031* (2013.01); *H04N 21/4318* (2013.01)

(58) Field of Classification Search
None
See application file for complete search history.

(56) References Cited

U.S. PATENT DOCUMENTS

| 9,324,374 B2 | 4/2016 | Rav-Acha et al. | |
|---|---|---|---|
| 2008/0019610 A1* | 1/2008 | Matsuzaka | G06K 9/00711 382/284 |
| 2017/0094194 A1* | 3/2017 | Adsumilli | H04N 5/272 |

OTHER PUBLICATIONS

Jonathan Long et al., Fully Convolutional Networks for Semantic Segmentation, IEEE Trans. Pattern Anal. Mach. Intell (TPAMI). vol. 39, Issue 4, Apr. 2017, pp. 640-651.

(Continued)

*Primary Examiner* — Heather R Jones
(74) *Attorney, Agent, or Firm* — BakerHostetler (57) ABSTRACT

A method and a system for automatic video production are provided herein. The method may include the following steps: obtaining a set of media entities, wherein at least one of the media entities comprises a background and at least one foreground object; automatically analyzing the media entities using visual analysis; automatically selecting at least two visual portions, based on the visual analysis; computing, for at least one of the visual portions, semantic segmentation indicative of a support of the at least one foreground object, based on the visual analysis; generating at least one visual effect in which the foreground object and the background undergo two different visual operations; and generating a video production by combining a plurality of the visual portions into one video production, while including the at least one visual effect in the video production.

20 Claims, 6 Drawing Sheets

(56) References Cited

OTHER PUBLICATIONS

Yi Li et al., Fully Convolutional Instance-aware Semantic Segmentation, CVPR 2017:4438-4446.
Satoshi Iizuka et al., Globally and Locally consistent Image Completion, ACM Transactions on Graphics, vol. 36, Issue 4, Jul. 2017, Article No. 107, ACM New York, NY, USA.

\* cited by examiner

METHOD AND SYSTEM FOR USING SEMANTIC-SEGMENTATION FOR AUTOMATICALLY GENERATING EFFECTS AND TRANSITIONS IN VIDEO PRODUCTIONS

CROSS-REFERENCE TO RELATED APPLICATIONS

This application claims the benefit of U.S. Provisional Patent Application No. 62/686,715, filed on Jun. 19, 2018, which is incorporated herein by reference in its entirety.

FIELD OF THE INVENTION

The present invention relates generally to the field of video editing and, more particularly, to automatically generating a video production on same through visual analysis.

BACKGROUND OF THE INVENTION

Prior to the background of the invention being set forth herein, it may be helpful to provide definitions of certain terms that will be used hereinafter.

The term "video production" used herein is the process of creating video by capturing moving images (videography) and creating combinations and reductions of parts of this video in live production and post-production (video editing). Video production can be generated from any type of media entity which defines still images as well as video footage of all kinds. In most cases, the captured video will be recorded on electronic media such as video tape, hard disk, or solid state storage, but it might only be distributed electronically without being recorded. It is the equivalent of filmmaking, but with images recorded electronically instead of film stock.

The term "background" as used herein is the part of an image that represents the stationary part of the scene that serves the farthest part of the scene relative to the camera capturing the scene. When the camera is non-stationary, the only movement of the background is due to the movement of the camera. The background may also include moving objects that were recognized as "non-important" based on some importance criteria.

The term "foreground object" as used herein is one or more parts of an image that represent objects that were indicated as "important", meaning of significance to understanding the scene, and, therefore, foreground objects include also stationary objects such as trees and standing cars as long as they have semantic significance in understanding the scene.

The term "semantic segmentation" or "semantic image segmentation" as used herein is the process linking or mapping each pixel of an image or a video into one of a plurality of physical object classes (e.g., human, car, road, tree), thereby providing an understanding of the scene on the pixel level. When applying a semantic segmentation to an image of a scene, the foreground objects are efficiently segmented from the background allowing to apply various operations on the various objects within the scene on the pixel level. In image processing terminology, the semantic segmentation is indicative of a support of at least one foreground object, meaning all pixels that belong to the at least one foreground object.

More specifically, semantic segmentation is the process of automatically separating between different objects in the scene, and between these objects and the background (which can also be addressed as a background object). The notion 'semantic' means that the separation is based on semantic notions, i.e., person, cat, chair, and the like, rather than on low-level visual cues such as edges. The output of the semantic segmentation process is one or more masks, which represent the support of each layer. For example, in the simplest case, there is a single mask, having a value of 1 for the pixels belonging to one of the foreground object classes such as a 'person', and 0 for the pixels in the background. These values may also be intermediate values between 0 and 1 (e.g., in the case of soft matting). Usually, there are two types of semantic segmentations: class-based and instance-based segmentations. In class based, all pixels belonging to the same class are assigned to the same segment (e.g., all people in the scene), while in instance-based segmentation, each different instance, e.g., each person is assigned with a different segment). This work deals with both. There is a lot of research in the topic of doing semantic segmentation. Some include regular semantic segmentation and other include instance based semantic segmentation. There are also more transitional ways to compute the segmentation, for example based on motion in a video (separating moving objects from the background).

The term "video transition" or simply "transition" as used herein is a visual operation used during the post-production process of video production in which separate shots are combined in order to present a change in the scene in a manner that other than a mere "cut" between the shots. An example can be a fade-in or fade-out one shot into a consecutive shot.

It would, therefore, be advantageous to be able to automatically generate video transitions or visual effects based on a semantic segmentation of the visual media.

SUMMARY OF THE INVENTION

In accordance with some embodiments of the present invention, a method and a system for automatic video production are provided herein. The method may include the following steps: obtaining a set of media entities, wherein at least one of the media entities comprises a background and at least one foreground object; automatically analyzing the media entities using visual analysis; automatically selecting at least two visual portions, based on the visual analysis; computing for at least one of the visual portions, semantic segmentation indicative of a support of the at least one foreground object, based on the visual analysis; generating at least one masking transition between at least a first and a second visual portions, wherein, in the masking transition, either the foreground object of the first visual portion appears over the second visual portion or the foreground object of the second visual portion appears over the first visual portion; and generating a video production by combining a plurality of the visual portions into one video production, while including the at least one masking transition in the video production.

In accordance with other embodiments of the present invention, a method and a system for automatic video production are provided herein. The method may include the following steps: obtaining a set of media entities, wherein at least one of the media entities comprises a background and at least one foreground object; automatically analyzing the media entities using visual analysis; computing for at least one of the media entities, semantic segmentation indicative of a support of the at least one foreground object, based on the visual analysis; generating at least one transition between at least two of the media entities, wherein a transition between a first media entity to a second media entity exhibits a combination of the first and the second media entities, in which, for at least one of the media entities, the pixels belonging to a foreground object and the pixels belonging to the background undergo two different visual operations; and generating a video production by combining a plurality of the media entities into one video production, while including the at least one transition in the video production.

In accordance with yet other embodiments of the present invention, a method and a system for automatic video production are provided herein. The method may include the following steps: obtaining a set of media entities, wherein at least one of the media entities comprises a background and at least one foreground object; automatically analyzing the media entities using visual analysis; automatically selecting at least two visual portions, based on the visual analysis; computing, for at least one of the visual portions, semantic segmentation indicative of a support of the at least one foreground object, based on the visual analysis; generating at least one visual effect in which the foreground object and the background undergo two different visual operations; and generating a video production by combining a plurality of the visual portions into one video production, while including the at least one visual effect in the video production.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Automatic video editing is a process in which a raw footage that includes videos and photos is analyzed, and portions from that footage are selected and produced together to create an edited video. Sometimes, an additional music soundtrack is attached to the input footage, resulting in a music clip that mixes the music and videos/photos together.

A common flow for automatic video editing (but not the only possible flow) is:

Analyzing the input footage.

Automatically selecting footage portions and decision making.

Adding transitions and effects and rendering the resulting edited video.

The automatic selection and decision-making stage usually consists of:

Selecting the best portions of the videos and photos.

Determine the ordering of these portions in the edited video.

For each visual portion (also referred herein as "cut"), deciding whether the audio of this video will be played or not (or a more general mix with the soundtrack).

In accordance with some embodiments of the present invention, it is suggested to use semantic segmentation in order to automatically generate transitions and effects that consider the semantic understanding of the footage, in terms of the objects it contains.

Figure 1:
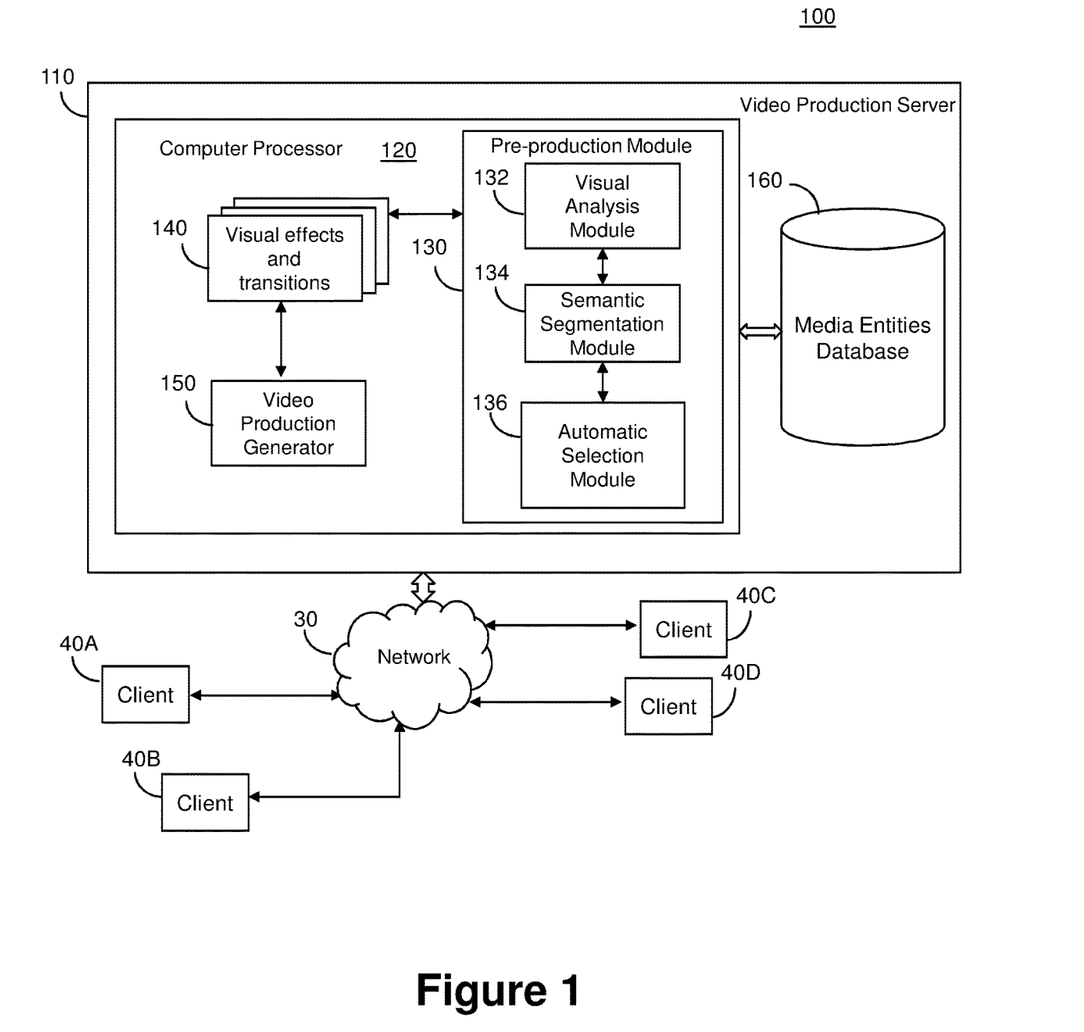
FIG. 1 is a block diagram illustrating a non-limiting exemplary system in accordance with some embodiments of the present invention.

FIG. 1 is a block diagram illustrating a non-limiting exemplary system 100 in accordance with some embodiments of the present invention. Video production server 110 may be connected over a network, such as the internet, to a plurality of client devices 40A-40C which, in turn, may upload media entities, such as photos and videos, to video production server 110 where they may be stored on media entities database 160.

In accordance with some embodiments of the present invention, video production server 110 may include a preproduction module 130 implemented on computer processor 120 and configured to obtain set of media entities either from clients 40A-40D or from media entities database 160, wherein at least one of the media entities includes a background and at least one foreground object. Video production server 110 may further include a visual analysis module 132 implemented on computer processor 120 and configured to automatically analyze the media entities using visual analysis. Video production server 110 may include a semantic segmentation module 134 implemented on computer processor 120 configured to compute, for at least one of the visual portions, semantic segmentation indicative of a support of the at least one foreground object, based on the visual analysis. Video production server 110 may include an automatic selection module 136 implemented on computer processor 120 and configured to automatically select at least two visual portions, based on the visual analysis.

Video production server 110 may further include visual effects and transitions module 140 implemented on computer processor 120 and configured to generate at least one masking transition between at least a first and a second visual portions, wherein, in the masking transition, either the foreground object of the first visual portion appears over the second visual portion, or the foreground object of the second visual portion appears over the first visual portion. Video production server 110 may further include a video production generator 150 implemented on computer processor 120 and configured to generate a video production by combining a plurality of the visual portions into one video production, while including the at least one masking transition in the video production.

In accordance with other embodiments of the present invention, pre-production module 130 may be configured to obtain a set of media entities, wherein at least one of the media entities comprises a background and at least one foreground object. Visual analysis module 132 may be configured to automatically analyze the media entities using visual analysis. Semantic segmentation module 134 may be configured to compute for at least one of the media entities, semantic segmentation indicative of a support of the at least one foreground object, based on the visual analysis. Visual effects and transitions module 140 may be configured to generate at least one transition between at least two of the media entities, wherein a transition between a first media entity to a second media entity exhibits a combination of the first and the second media entities, in which, for at least one of the media entities, the pixels belonging to a foreground object and the pixels belonging to the background undergo two different visual operations. Video production generator 150 may be configured to generate a video production by combining a plurality of the media entities into one video production, while including the at least one transition in the video production.

In accordance with yet other embodiments of the present invention, pre-production module 130 may be configured to obtain a set of media entities, wherein at least one of the media entities includes a background and at least one foreground object. Visual analysis module 132 may be configured to automatically analyze the media entities using visual analysis; automatically selecting at least two visual portions, based on the visual analysis. Semantic segmentation module 134 may be configured to compute, for at least one of the visual portions, semantic segmentation indicative of a support of the at least one foreground object, based on the visual analysis. Visual effects and transitions module 140 may be configured to generate at least one visual effect in which the foreground object and the background undergo two different visual operations. Video production generator 150 may be configured to generate a video production by combining a plurality of the visual portions into one video production, while including the at least one visual effect in the video production.

Automatically Generating Masking Transitions via Semantic Segmentation

According to some embodiments of the present invention, masking transitions may be automatically generated based on semantic segmentation. Masking transitions (sometimes denoted as "Mask Transitions" or "Transition Masks" in the manual post-production community) are transitions between consecutive cuts in an edited video that use a mask, being a set of pixels in a video or in an image that is computed for either first cut, second cut, or both. In this invention, the mask is derived from the semantic segmentation.

Figure 2:
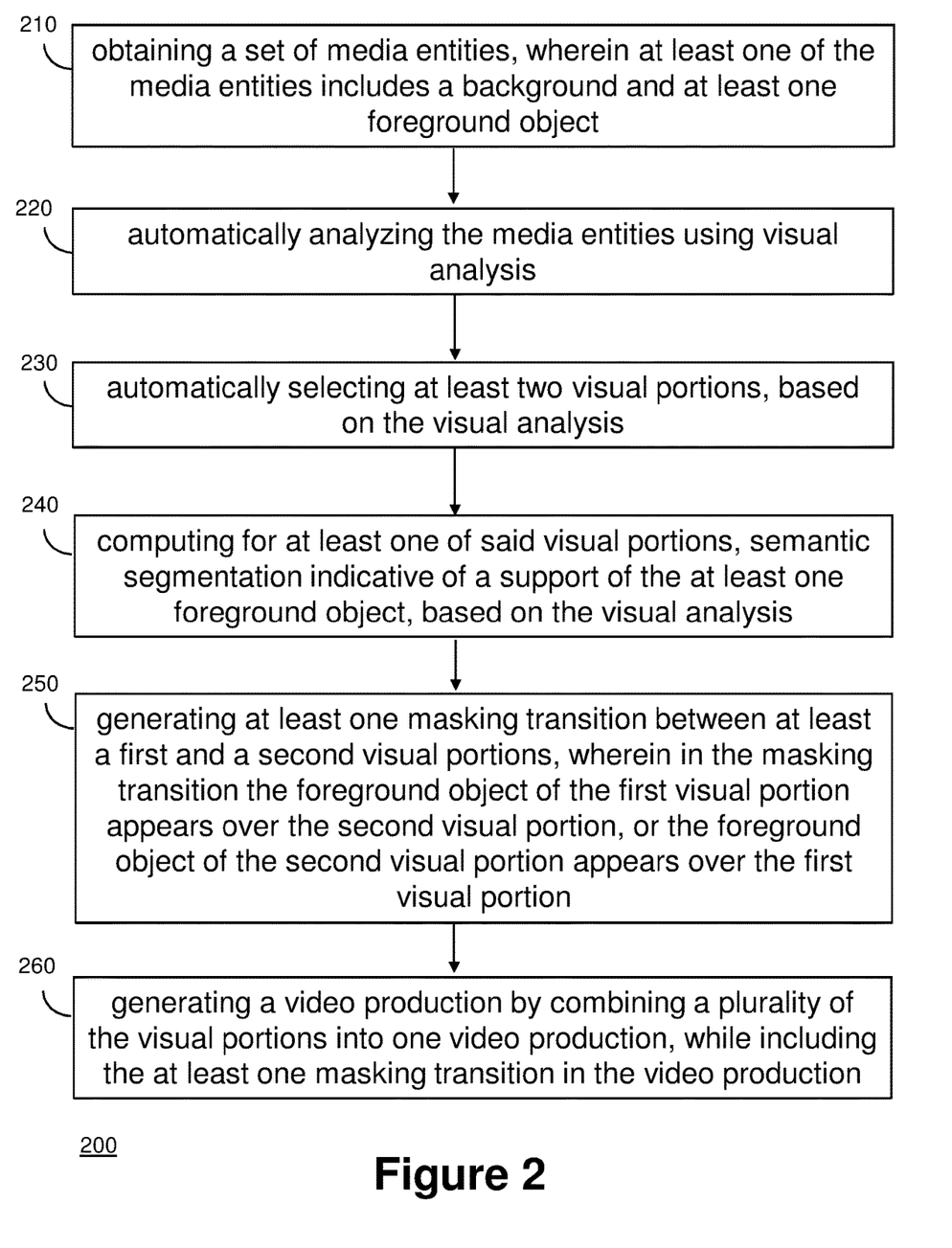
FIG. 2 is a flowchart diagram illustrating a non-limiting exemplary method in accordance with some embodiments of the present invention.

FIG. 2 is a flowchart diagram illustrating a non-limiting exemplary method 200 in accordance with some embodiments of the present invention. Method 200 may include the following steps: obtaining a set of media entities, wherein at least one of the media entities includes a background and at least one foreground object 210; automatically analyzing the media entities using visual analysis 220; automatically selecting at least two visual portions, based on the visual analysis 230; computing, for at least one of the visual portions, semantic segmentation indicative of a support of the at least one foreground object, based on the visual analysis 240; generating at least one masking transition between at least a first and a second visual portions, wherein, in the masking transition, either the foreground object of the first visual portion appears over the second visual portion, or the foreground object of the second visual portion appears over the first visual portion 250; and generating a video production by combining a plurality of the visual portions into one video production, while including the at least one masking transition in the video production 260.

Figure 3:
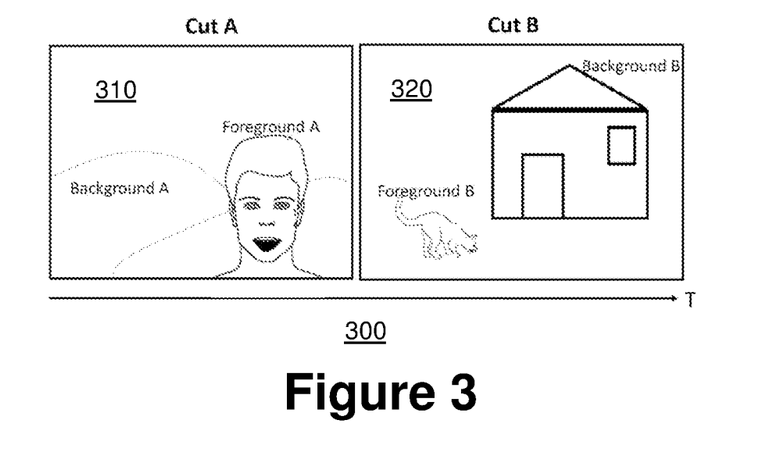
FIG. 3 is a diagram illustrating an exemplary transition in accordance with some embodiments of the present invention.

FIG. 3 is a diagram illustrating an exemplary transition 300 in accordance with some embodiments of the present invention. A simple case of masking transition is a transition in which foreground objects from the new cut enter the edited video at a different timing than the background. Two consecutive cuts (visual portions) in the edited video—first cut (cut A) 310 and second cut (cut B) 320. In a trivial transition, the scene would change between cut A and cut B without dependence on the objects within the scene (e.g., Foreground B and Background B). For example, in a simple 'dissolve' transition, the scene gradually changes from cut A to cut B, using temporal averaging between the two cuts. In masking transitions, this timing depends on the extracted objects or object classes.

Figure 4:
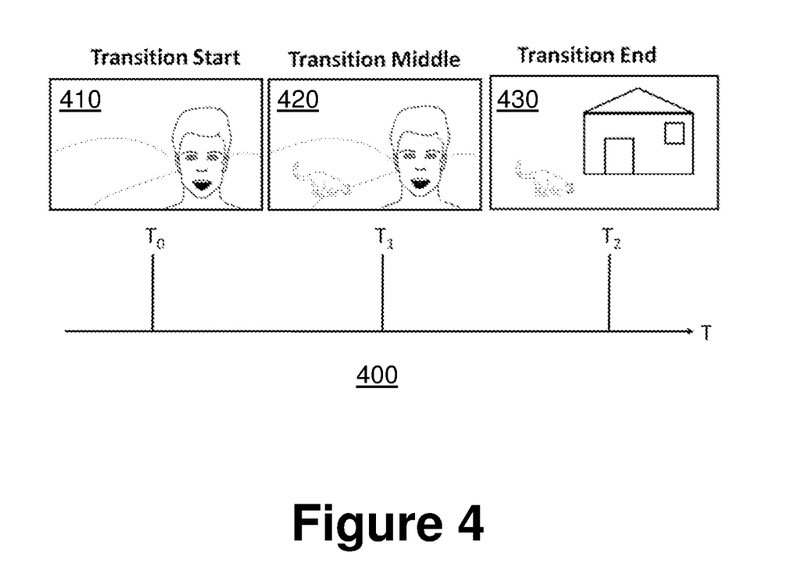
FIG. 4 is a timeline diagram illustrating a non-limiting exemplary transition in accordance with some embodiments of the present invention.

FIG. 4 shows a timeline diagram 400 illustrating a non-limiting exemplary masking transition in accordance with some embodiments of the present invention. In this example, after cut A appears as 'Transition Start' 410, the foreground object in cut B (the cat) enters first (to yield 'Transition Middle' 420), and only later the rest of cut B (to yield 'Transition End' 430). It is noted that the timing of entrance is based on the semantic segmentation—the appearance in the edited video of the foreground portions belonging to the semantic class 'cat' precede the appearance of the background portions. It should be noted that a transition with an opposite effect can be achieved when a foreground object appearing in cut A (the person in this case) continues to appear over cut B.

In accordance with some embodiments of the present invention, a method implementing the automatic generation of masking transitions may include the following steps: obtaining a set of media entities, wherein at least one of the media entities comprises a background and at least one foreground object; automatically analyzing the media entities using visual analysis; automatically selecting at least two visual portions, based on the visual analysis; computing, for at least one of the visual portions, semantic segmentation indicative of a support of the at least one foreground object, based on the visual analysis; generating at least one masking transition between at least a first and a second visual portions, wherein, in the masking transition, either the foreground object of the first visual portion appears over the second visual portion, or the foreground object of the second visual portion appears over the first visual portion; and generating a video production by combining a plurality of the visual portions into one video production, while including the at least one masking transition in the video production.

When referring to the entrance timing, this timing may not be a single time point (as in the case of a simple cut), but rather it can be a time range (as in the case of a dissolve effect, where the entrance is done via a gradual averaging between the pixels belonging to the entering objects and the pixels belonging to the previous cut).

More generally, the entrance timing may depend on the support of the semantic class of each object (or depend on the support of each instance, in the case of instance based semantic segmentation). The segmented objects may either be in cut B (in which case, usually foreground objects enters first) or objects in cut A (in which case, usually the background is replaced first with content from cut B).

Even more generally, transitions may depend on the semantic segmentation in other ways, for example, applying different color transformations on different semantic classes, (for example, one color transformation for the foreground object, and one for the background), using in the transition a different motion path for different objects, or applying multiple effects where each effect is applied on a different semantic class, and the like.

Masking Transitions Conditioned Upon Objects Positions

In some embodiments of the invention, applying the masking transition is conditioned upon the position or existence of objects in the first and second cut (cut A and cut B) relative to the frame. Two typical conditions may be:

(a) Apply the masking transition if the position of the foreground objects in cut A is in the opposite side to the position of the foreground objects in cut B (e.g., left vs. right).

(b) Apply the masking transition if there is no foreground object in cut A (i.e., scenery shot).

More generally, the condition may be applying the masking transition if there is no spatial overlap between foreground objects in cut A and in cut B.

Figure 5:
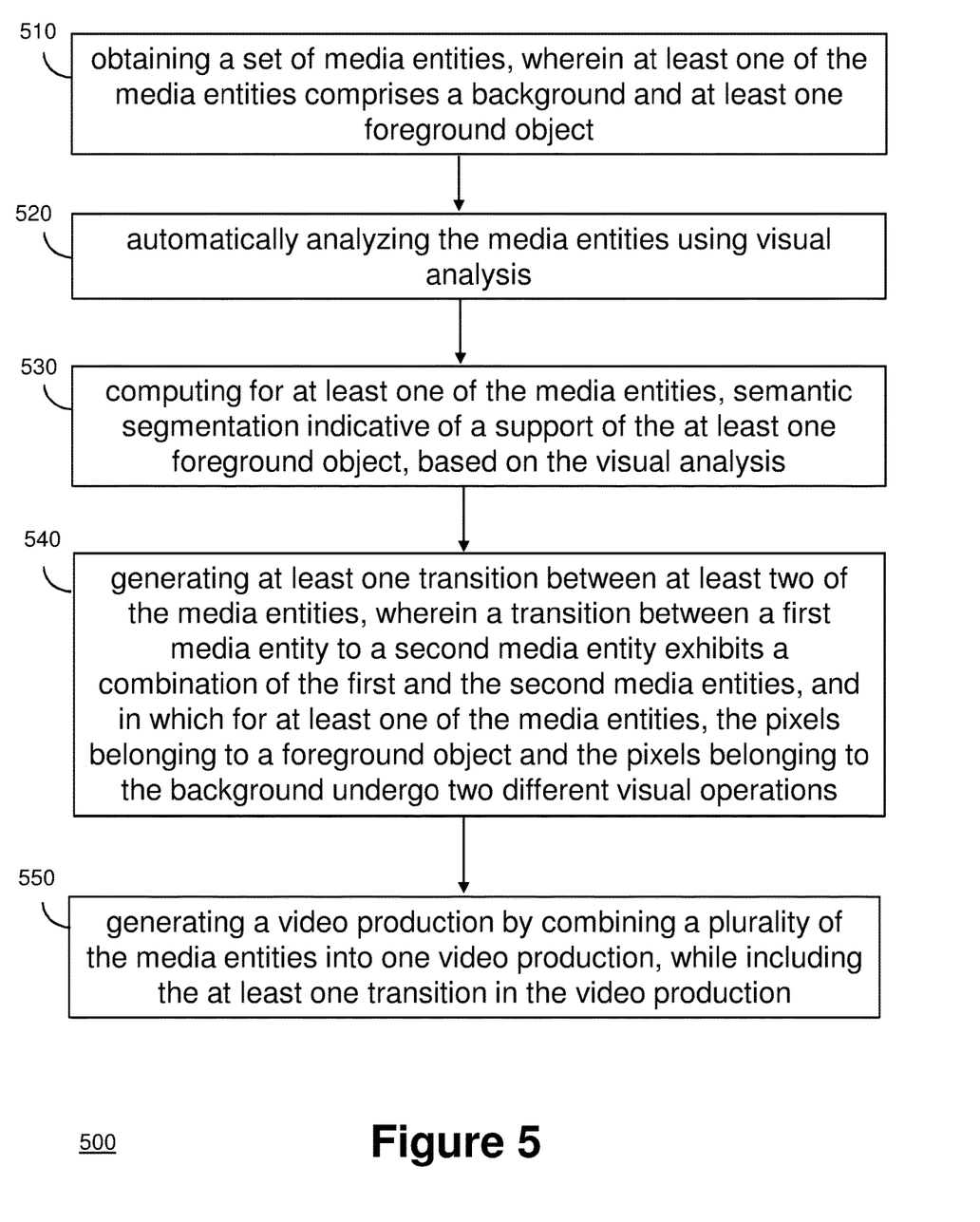
FIG. 5 is a flowchart diagram illustrating a non-limiting exemplary method in accordance with some embodiments of the present invention.

FIG. 5 is a flowchart diagram illustrating a non-limiting exemplary method in accordance with some embodiments of the present invention. Method 500 of automatic video production may include the following steps: obtaining a set of media entities, wherein at least one of the media entities comprises a background and at least one foreground object 510; automatically analyzing the media entities using visual analysis 520; computing, for at least one of the media entities, semantic segmentation indicative of a support of the at least one foreground object, based on the visual analysis 530; generating at least one transition between at least two of the media entities, wherein a transition between a first media entity to a second media entity exhibits a combination of the first and the second media entities, and in which for at least one of the media entities, the pixels belonging to a foreground object and the pixels belonging to the background undergo two different visual operations 540; and generating a video production by combining a plurality of the media entities into one video production, while including the at least one transition in the video production 550.

Visual Effects that are Based on Semantic Segmentation

Figure 6:
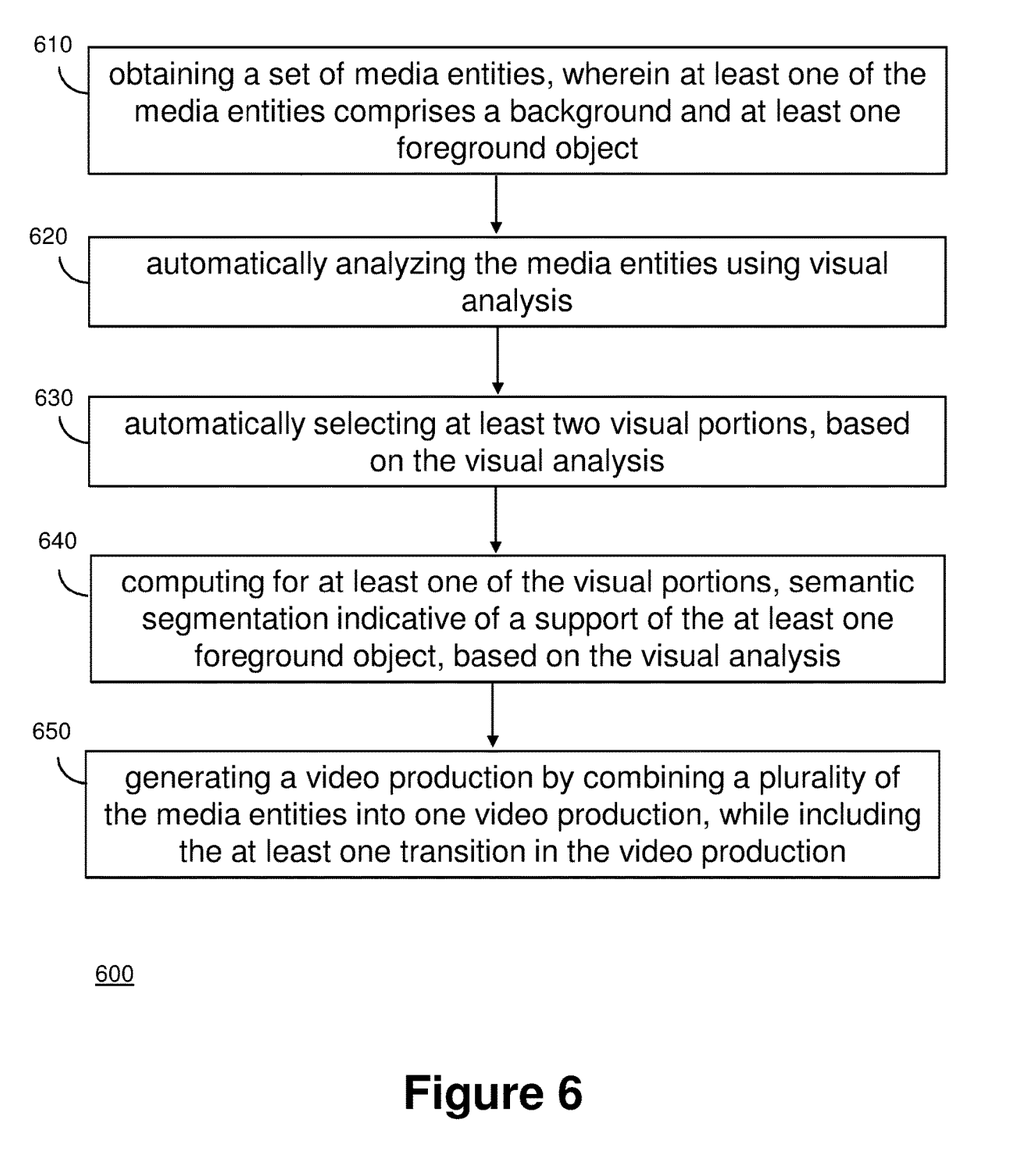
FIG. 6 is a flowchart diagram illustrating a non-limiting exemplary method in accordance with some embodiments of the present invention.

FIG. 6 is a flowchart diagram illustrating a non-limiting exemplary method in accordance with some embodiments of the present invention. Method 600 of automatic video production may include the following steps: obtaining a set of media entities, wherein at least one of the media entities may include a background and at least one foreground object; automatically analyzing the media entities using visual analysis 610; automatically selecting at least two visual portions, based on the visual analysis 620; computing, for at least one of the visual portions, semantic segmentation indicative of a support of the at least one foreground object, based on the visual analysis 630; generating at least one visual effect in which the foreground object and the background undergo two different visual operations 640; and generating a video production by combining a plurality of the visual portions into one video production, while including the at least one visual effect in the video production 650.

The usage of semantic segmentation can also upgrade the complexity of visual effects. This can be done by letting the visual effects be a function of the semantic classes. One example for this idea are effects, in which an artificial object or decoration is added in-between different layers—for example, occluded by the foreground objects, but occluding the background. Another example is applying an effect only on portions of the footage that belong to a specific object—for example, duplicating or applying some color transformation or motion transformation on portions belonging to specific semantic classes such as a person. For example, a visual effect where the pixels belonging to a certain object instance or object class are slightly shifted to the right or changes its colors.

Additional information that can be extracted and used by a masking visual transition or effect, is statistics from the semantic segmentation—for example, using the center of mass of the mask, or its borders, as parameters for the effect or transition.

Layer Separation and Depth Ordering

In accordance with some embodiments of the present invention, the semantic segmentation may include a plurality of foreground objects located in different depths within a scene, at a specified order of layers, and wherein the generating of the at least one visual effect may be further based on the specified order of layers.

A different way to formulate masking transitions and mask effects, is by (a) separating the scene to layers, (b) applying a different transition or effect on each layer, and then (c) merging the results from different layers. The layer separation itself is based on semantic segmentation, but it may also be computed directly, for example based on a given or a computed depth (in this case, the layers may be depth layers).

In one embodiment of the invention (for both the semantic segmentation representation or the layer separation representation), the transition or effect may require some depth ordering information, in order to understand which layer or object is more frontal than other layers or objects. One possible way to extract depth ordering is based on semantic classes from the semantic segmentation (e.g., 'person' occludes a 'house'), or based on low level cues (e.g., shape of corners in the intersection) or based on various methods such as direct deep learning of the depth or of the depth ordering.

Video and Photo Masks

The source footage for video editing can be either photos or videos, or a mixture of both. Respectively, the semantic segmentation can be applied either to images or to videos, and the respective visual effect or transition can use this semantic segmentation in either way.

In some embodiments of the invention, the segmentation is a video itself, depicting the semantic segmentation of the scene in each frame of an input video. In another embodiment, the source is a photo, in which case the semantic segmentation is an image too.

Using Image Completion

In accordance with some embodiments of the present invention, the method may further include the step of detecting missing background pixels, due to motion of the at least one foreground object resulting from the at least one visual effect and carrying out background completion by estimating values of the missing background pixels.

In some embodiments of the invention, after separating the foreground layers from the background, the background layer is filled automatically, i.e., filling pixels that were occluded by foreground objects in the original photo or video and are now being "holes" in the separated background image. This operation is usually denoted as "image completion". This operation enables, for example, applying visual effects and transitions that require the background layer to be a complete image (or video) without holes.

A simple example to demonstrate the possible need for image completion is when the effect or transition applies a shift operation on a foreground layer. In such a case, the image portions which were occluded by the foreground layers in the source footage, become visible after applying the effect or the transition, but there is no information in the original footage regarding the actual value of these portions, as they were occluded. However, the value of this portions can either be estimated (for example, from different frames in a video) or hallucinated (for example, filling the holes with values that are not the real values but look natural and visually pleasing, for example, based on natural image statistics).

Figure 7:
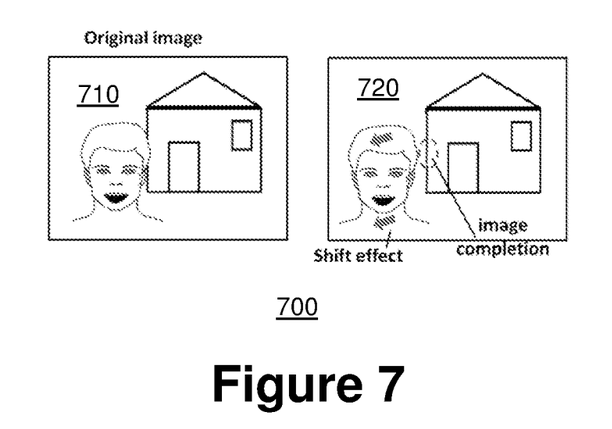
FIG. 7 is a diagram illustrating an exemplary visual effect in accordance with some embodiments of the present invention.

FIG. 7 is a diagram illustrating an exemplary visual effect 720 in accordance with some embodiments of the present invention. In the visual effect illustrated, the person in original image 710 is shifted to the left in the processed image 720, revealing a hole behind it which can be filled-in using image completion based on the background. In this example, image completion was used for hallucinating the occluded part of the house which became visible. Image completion can be carried out using several of well-known algorithms, for example, using deep learning or texture synthesis. In a simple case, when only the pixels near the hole-boundaries should be filled (for example, when the effect applies a small shift on the foreground layer), simple color extrapolation methods can be used to only fill the neighborhood portions of the hole boundaries. When applying the visual effect on the original image, the person is shifted to the left, revealing a hole behind it which should be filled using image completion using the background (in this example, filling the occluded part of the house).

Using Object Importance Combined with Semantic Segmentation

In accordance with some embodiments of the present invention, the method further includes the step of identifying an important character in the set of media entities. Then, the at least one foreground object is determined as the region in the scene belonging to the important character, whereas the non-important character(s) become pan of the background.

In some embodiments of the invention, the visual effect or transitions are based on a combination of a semantic segmentation and an importance measure of different object classes or object instances. For example, in a masking transition where only the person-instance that belongs to a main or important character in the video appears first in the transition, and only later the rest of the instances and the background appear. In this case, the pixels corresponding to the important character may be computed by taking all the pixels that belong to the instance of this main character. The main character may be identified independently from the semantic segmentation, for example, by using face recognition (in which case, each instance-segment of a person may be linked to the identity of the face included in the portion of this segment). The importance of objects can be determined using various methods, for example based on the frequency of this object in the footage, based on other cues such as zooming on this object in the input movie, based on external knowledge (for example, identifying a known character) or based on pre-defined weights (for example, setting a different weights to different object classes such as person, car, pets, and the like).

Visual effects and transitions that use the importance of objects may be used to help in improving the storytelling by applying effects that are based on the story to be told, for example, based on important characters in the video. As an example, the masking transition can be applied when the mask consists only of pixels belonging to an important character.

Adding Text to Visual Effects and Transitions Based on Semantic Segmentation

In accordance with some embodiments of the invention, the visual effect may include integrating a text within at least one visual portion. The integrating may be further based on the specified order of layers.

In one embodiment of the invention, a text message can also be integrated with the semantic segmentation as part of the visual effect or transition. This integration can be done by letting the text be addressed as a depth layer and act accordingly.

Figure 8:
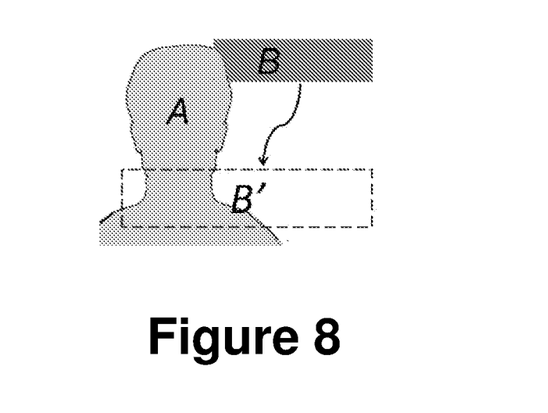
FIG. 8 is a diagram illustrating another exemplary visual effect in accordance with some embodiments of the present invention.

FIG. 8 is a diagram illustrating another exemplary visual effect in accordance with some embodiments of the present invention. This example illustrates a text effect that is based on semantic segmentation. The text massage is dynamically moving from behind the object A, to the front of the image. In a similar way, the text message may be inserted to any depth layer in the image, based on the semantic segmentation. For example, the text may be occluded by foreground objects, and it may occlude background objects. Thus, sematic segmentation that takes into account depth of the scene of various foreground object may offer more flexibility when text is being edited into the video production.

In accordance with some embodiments of the present invention, the methods described herein may be implemented as a non-transitory computer readable medium. For example, by a non-transitory computer readable medium which includes a set of instructions, when executed, cause the least one processor to: obtain a set of media entities, wherein at least one of the media entities may include a background and at least one foreground object; automatically analyze the media entities using visual analysis; automatically select at least two visual portions, based on the visual analysis; compute for at least one of the visual portions, semantic segmentation indicative of a support of the at least one foreground object, based on the visual analysis; generate at least one masking transition between at least two of the visual portions, wherein a masking transition between a first visual portion to a second visual portion exhibits a combination of the first and the second visual portions, in which either the foreground object of the first visual portion appears over the second visual portion or the foreground object of the second visual portion appears over the first visual portion; and generate a video production by combining a plurality of the visual portions into one video production, while including the at least one masking transition in the video production.

In order to implement the method according to some embodiments of the present invention, a computer processor may receive instructions and data from a read-only memory or a random-access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to some embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which may include one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of automatic video production comprising:
   obtaining a set of media entities comprising pixels, wherein at least one of the media entities comprises a background and at least one foreground object;
   automatically analyzing the media entities using visual analysis;
   automatically selecting at least two visual portions, based on said visual analysis;
   computing, for at least one of said visual portions, semantic segmentation indicative of a support of the at least one foreground object, based on said visual analysis, wherein said computing assigns said pixels with respective pixel values based on the sematic segmentation;
   generating at least one masking transition being temporally ordered between at least a first and a second visual portions, wherein, in said masking transition, either the foreground object of the first visual portion appears over the second visual portion, or the foreground object of the second visual portion appears over the first visual portion wherein in a time prior to the transition, only said first visual portion is visible and wherein in a time post to said transition only said second visual portion is visible, wherein the masking transition is generated based on said respective pixel values; and
   generating a video production by combining a plurality of the visual portions into one video production, while including the at least one masking transition in the video production in said temporal order.

2. The method according to claim 1, wherein the semantic segmentation is carried out prior to the automatically selecting of said at least two visual portions.

3. The method according to claim 1, wherein an inclusion of said masking transition is conditioned upon one of: the position, the existence, or the level of importance of at least one foreground objects in one or more of the visual portions.

4. The method according to claim 1, wherein the generating of the masking transition is conditioned upon the spatial overlap between foreground objects in first and the second visual portions.

5. The method according to claim 1, wherein the generating of the masking transition is carried out based on a level of importance of at least one of the foreground objects.

6. The method according to claim 1, wherein said foreground object comprises a group of foreground objects belonging to a same semantic group.

7. The method according to claim 1, wherein in the masking transition, the appearance time of a foreground object is different from the appearance time of the background of the same visual portion.

8. A method of automatic video production comprising:
obtaining a set of media entities comprising pixels, wherein at least one of the media entities comprises a background and at least one foreground object;
automatically analyzing the media entities using visual analysis;
computing, for at least one of said media entities, semantic segmentation indicative of a support of the at least one foreground object, based on said visual analysis, wherein said computing assigns each of said pixels with respective pixel values based on the sematic segmentation;
generating at least one transition being temporally ordered between at least two of the media entities, wherein a transition between a first media entity to a second media entity exhibits a combination of the first and the second media entities, and in which, for at least one of the media entities, the pixels belonging to a foreground object and the pixels belonging to the background undergo two different visual operations, wherein in a time prior to the transition, only said first visual portion is visible and wherein in a time post to said transition only said second visual portion is visible, wherein the transition is generated based on said respective pixel values; and
generating a video production by combining a plurality of the media entities into one video production, while including the said at least one transition in the video production.

9. The method according to claim 8, wherein the different visual operations include at least one of: different appearance operator, and different motion.

10. The method according to claim 8, further comprising automatically selecting at least two visual portions from the media entities based on said visual analysis, wherein the generating of said video production is carried out by combining a plurality of the visual portions into one video production, while including the at least one transition in the video production.

11. A method of automatic video production comprising:
obtaining a set of media entities comprising pixels, wherein at least one of the media entities comprises a background and at least one foreground object;
automatically analyzing the media entities using visual analysis;
automatically selecting at least two visual portions, based on said visual analysis;
computing, for at least one of said visual portions, semantic segmentation indicative of a support of the at least one foreground object, based on said visual analysis, wherein said computing assigns said pixels with respective pixel values based on the sematic segmentation;
generating at least one visual effect in which the foreground object and the background undergo two different visual operations, wherein in a time prior to applying the visual effect, only one of said visual portions is visible and wherein in a time post to said applying of the visual effect only another one of said visual portions is visible, wherein the visual effect is generated based on said respective pixel values; and
generating a video production by combining a plurality of the visual portions into one video production, while including said at least one visual effect in the video production.

12. The method according to claim 11, further comprising:
detecting missing background pixels, due to motion of the at least one foreground object resulting from the at least one visual effect; and
carrying out background completion by estimating values of the missing background pixels.

13. The method according to claim 11,
wherein the semantic segmentation comprises a plurality of foreground objects located in different depths within a scene, at a specified order of layers, and
wherein the generating of the at least one visual effect is further based on said specified order of layers.

14. The method according to claim 13,
wherein the visual effect comprises integrating a text within at least one visual portion, and
wherein said integrating is further based on said specified order of layers.

15. The method according to claim 11, further comprising identifying an important character in the set of media entities, wherein the at least one foreground object is determined as the region in the scene belonging to said important character.

16. A non-transitory computer readable medium comprising a set of instructions that, when executed, cause at least one computer processor to:
obtain a set of media entities comprising pixels, wherein at least one of the media entities comprises a background and at least one foreground object;
automatically analyze the media entities using visual analysis;
automatically select at least two visual portions, based on said visual analysis;
compute, for at least one of said visual portions, semantic segmentation indicative of a support of the at least one foreground object, based on said visual analysis;
assign each of said pixels with respective pixel values based on the sematic segmentation;
generate at least one masking transition being temporally ordered between at least two of the visual portions, wherein a masking transition between a first visual portion to a second visual portion exhibits a combination of the first and the second visual portions, in which the foreground object of the first visual portion appears over the second visual portion or the foreground object of the second visual portion appears over the first visual portion, wherein in a time prior to the transition, only said first visual portion is visible and wherein in a time post to said transition only said second visual portion is visible, wherein the masking transition is generated based on said respective pixel values; and
generate a video production by combining a plurality of the visual portions into one video production, while including the at least one masking transition in the video production in said temporal order.

17. The non-transitory computer readable medium according to claim 16, wherein an inclusion of said masking transition is conditioned upon one of: the position, the existence, or the level of importance of at least one foreground objects in one or more of the visual portions.

18. The non-transitory computer readable medium according to claim 16, wherein the generating of the masking transition is carried out whenever there is no spatial overlap between foreground objects in first and the second visual portions.

19. The non-transitory computer readable medium according to claim 16, wherein the generating of the masking transition is carried out based on a level of importance of at least one of the foreground objects.

20. The non-transitory computer readable medium according to claim 16, wherein said foreground object comprises a group of foreground objects belonging to a same semantic group.

* * * * *